(12) United States Patent
Ferrell, Jr. et al.

(10) Patent No.: US 9,611,419 B1
(45) Date of Patent: Apr. 4, 2017

(54) WELL CEMENTING

(71) Applicants: James C. Ferrell, Jr., Brookshire, TX (US); Lauren T. Gallagher, Katy, TX (US); Bilal H. Bazzi, Irving, TX (US)

(72) Inventors: James C. Ferrell, Jr., Brookshire, TX (US); Lauren T. Gallagher, Katy, TX (US); Bilal H. Bazzi, Irving, TX (US)

(73) Assignee: FRITZ INDUSTRIES, INC. A CORPORATION OF TEXAS, Dallas, TX (US)

( * ) Notice: Subject to any disclaimer, the term of this patent is extended or adjusted under 35 U.S.C. 154(b) by 0 days.

(21) Appl. No.: 14/999,144

(22) Filed: Apr. 1, 2016

Related U.S. Application Data

(60) Provisional application No. 62/178,450, filed on Apr. 10, 2015.

(51) Int. Cl.
| | |
|---|---|
| *C09K 8/00* | (2006.01) |
| *C04B 7/00* | (2006.01) |
| *C04B 16/00* | (2006.01) |
| *C04B 24/00* | (2006.01) |
| *C09K 8/487* | (2006.01) |
| *C04B 28/04* | (2006.01) |
| *C04B 24/26* | (2006.01) |

(52) U.S. Cl.
CPC .......... *C09K 8/487* (2013.01); *C04B 24/2652* (2013.01); *C04B 28/04* (2013.01)

(58) Field of Classification Search
CPC ...... C09K 8/487; C04B 28/04; C04B 24/2652
USPC .......................... 523/130; 106/808, 809, 810
See application file for complete search history.

(56) References Cited

U.S. PATENT DOCUMENTS

| | | |
|---|---|---|
| 4,678,591 A | 7/1987 | Giddings et al. |
| 5,988,279 A | 11/1999 | Udarbe et al. |
| 6,085,840 A | 7/2000 | Laramay et al. |
| 6,089,318 A | 7/2000 | Laramay et al. |
| 6,136,935 A | 10/2000 | Udarbe et al. |

*Primary Examiner* — David Karst
(74) *Attorney, Agent, or Firm* — Thomas R. Weaver

(57) ABSTRACT

A hydraulic well cementing composition is disclosed. The well cementing composition contains a hydraulic cement and a fluid loss additive. The fluid loss additive is the polymerization reaction product of a two vinylamide monomers, wherein the polymerization reaction is conducted in the presence of a molecular weight control agent. One of the vinylamide monomers includes a sulfonic acid function, the second vinylamide monomer does not include a sulfonic acid function. The fluid loss additive controls fluid loss at temperatures up to 350° F.

10 Claims, No Drawings

WELL CEMENTING

BACKGROUND OF THE INVENTION

This is a non provisional application of provisional application 62/178,450 filed Apr. 10, 2015.

TECHNICAL FIELD OF THE INVENTION

This invention relates to well cementing. The invention further relates to a hydraulic cementing composition useful to support pipe in a borehole which penetrates one or more subsurface earth formations. The invention still further relates to a synthetic copolymer useful to reduce the loss of water from a slurry of hydraulic cement in water. A composition having such a use is referred to in the art as a cementing fluid loss additive.

DESCRIPTION OF THE PRIOR ART AND PROBLEMS SOLVED

It is known in the art of well cementing to form a sheath of hardened cement in the annular space between a well pipe, such as a casing, and the walls of a well bore which penetrates a subterranean earth formation. The purpose of the sheath is to support the casing in the well bore and to prevent undesirable movement of formation fluids, such as oil, gas and water, within the annular space between subsurface formations and/or to the surface of the earth. The process of forming the sheath is referred to in the art as primary cementing.

In the art of primary cementing, a slurry of hydraulic cement in water is pumped down the interior of the casing and caused to circulate up from the bottom of the casing in the annulus to a desired location therein. The slurry is then permitted to remain undisturbed (static) in the annulus for a time sufficient to enable the hydraulic cement to react with the water in the slurry, i.e., set, to produce the sheath of hardened cement.

A slurry of hydraulic cement in water, when first placed in the annulus, and for a period of time thereafter, acts as a true liquid and can transmit hydrostatic pressure. Loss of water from the slurry to the formation, referred to as fluid loss, causes a reduction in slurry volume which can cause pressure loss. Gas migration within the setting slurry can occur if pressure loss occurs at a time when the slurry has gelled to a degree which prevents full transmission of hydrostatic pressure.

A slurry of hydraulic cement, over a period of time, sets into a hardened mass having compressive strength. It is believed that the hardening process experiences three phases.

During the first phase of the hardening process, it is believed that the setting slurry retains liquid sufficient to enable it to transmit full hydrostatic pressure in the well bore through the column of cement slurry. It is believed that gas migration will not occur if there is sufficient transmitted pressure to oppose formation gas pressure. The first phase ends when the developed static gel strength attains a first critical value which is believed to be about 100 lb-force/100 sq. ft. The period of time required for a slurry of hydraulic cement to reach the first critical value is referred to as zero gel time. Zero gel time is thus defined as the time required for a slurry to develop a static gel strength of about 100 lb-force/100 sq. ft. During this time, it is believed that the volume of fluid lost to the formation will not result in loss of pressure across a gas zone in an amount sufficient to permit gas migration.

During the second phase of the hardening process, the developed static gel strength exceeds the first critical value. The setting slurry loses the ability to transmit full hydrostatic pressure, but fluid loss continues. As a setting slurry passes from a fluid state to a gelled state, defined as the transition period, hydrostatic pressure cannot be fully transmitted. Accordingly, any loss of fluid volume during the transition period will cause loss of pressure across a gas zone, which could result in gas migration. The second phase ends when the developed gel strength attains a second critical value which is sufficient to resist formation gas pressure. It is believed that the second critical value is about 500 lb-force/100 sq. ft. The purpose of a cementing fluid loss additive is to provide fluid loss control during the transition period. It is desired that the transition time be as short as possible.

During the third phase of the hardening process, gas migration is prevented if a gas channel has not been previously formed, because developed gel strength is greater than the second critical value and is sufficient to resist formation gas pressure.

It is desirable to extend zero gel time and to reduce transition time. The loss of fluid from a slurry of hydraulic cement in water increases with increase in bottom hole circulating temperature. Accordingly, a material to be added to a slurry of hydraulic cement to extend zero gel time and to reduce transition time, while reducing fluid loss rate at bottom hole circulating temperatures, is a subject addressed herein.

It is known in the art that a slurry of hydraulic cement is comprised of particles of a hydraulic cement suspended or dispersed in water. The slurry can also include various added materials, for example, fluid loss additives, dispersants, suspension agents, strength stabilizing agents, set time retarders, set time retarder intensifiers and defoamers.

A slurry of hydraulic cement in water can be caused to flow, such as with pumping equipment, down a well pipe and then upwardly into an annular space where it is permitted to remain static while it sets into a hardened sheath. The study of the ability of a slurry of hydraulic cement in water to flow is included in a term broadly referred to as rheology, which, in large part, is concerned with the flow of matter in the liquid phase. Such liquids can be classed as either Newtonian fluids or as non-Newtonian fluids. A non-Newtonian fluid exhibits an apparent change in viscosity with rate of change of strain (strain rate). A slurry of hydraulic cement in water is a non-Newtonian fluid.

A rheological property of a slurry of hydraulic cement in water which is of particular interest to persons skilled in the art of well cementing is the ability of the slurry to suspend the particles of cement in the fluid. The rheological properties must be adequate to suspend solids at surface conditions during mixing, and also at down hole temperature and pressure. The goal is to prevent solids settling and bridging while pumping. Instruments employed to measure this settling property provide numerical readings at various shear rates (measured in rpm). As a general rule, higher numerical readings indicate satisfactory suspension and lower readings indicate less satisfactory to unacceptable suspension. A combination of materials added to a slurry can be necessary to provide a slurry having low water loss, as well as satisfactory solids suspension and acceptable pumping time.

Consistency is a rheological property of a fluid which is related to cohesion of individual particles of a material in the fluid, such as the particles of cement in the slurry, the ability of the fluid to deform and resistance of the fluid to flow. The consistency of a cement slurry is determined by thickening time tests and is a measure of the ability of the slurry to be pumped. Consistency is, accordingly, a measure the pumpability of a cement slurry.

A cement slurry must contain a sufficient quantity of water to enable sufficient hydration of the cement particles. In addition, there must be a sufficient quantity of water in the slurry to enable it to be pumped, but not so much that the consistency (sometimes known as apparent viscosity) of the slurry is not sufficient to retain the particles of cement in suspension during the hardening process.

Rheology, including consistency, is affected by fluid loss. Fluid loss can be adjusted by materials added to a cementing composition. Such materials include fluid loss additives, suspending agents and dispersants. This invention, accordingly, further addresses cementing compositions comprised of fluid loss additives, retarders, dispersants and suspending agents.

SUMMARY OF THE INVENTION

This invention provides a process for making a cementing fluid loss additive, and the product of the process for making the cementing fluid loss additive. This invention also provides a method of making a cementing composition containing the cementing fluid loss additive, and the product of the method of making the cementing composition containing the cementing fluid loss additive.

The cementing composition of this invention is useful to form a sheath of hardened cement in the annular space between a well pipe disposed in a well bore and the walls of the well bore. The cementing composition can be a mixture of dry ingredients comprising hydraulic cement, the fluid loss additive of this invention and one or more other additive materials. In another aspect the fluid loss additive can be in a liquid form. When the cementing composition is mixed with water a slurry is produced which can be pumped into the mentioned annular space. The slurry can suspend solid particles while the slurry sets into a hardened mass. The slurry experiences low fluid loss from the slurry at temperatures up to about 350° F.

DESCRIPTION OF THE INVENTION

The cementing fluid loss additive of this invention is a synthetic copolymer made by the reaction of two different vinylamide derivatives. The reaction is performed in the presence of a molecular weight control material and at a pH in the range of from about 7.0 to about 10.5 and preferably in the range of from about 9.0 to about 10.5. The first vinylamide derivative is a monomer which does include a sulfonic acid function in its structure. The second vinylamide derivative is a monomer which does not include a sulfonic acid function in its structure.

Vinylamide monomers useful herein which do include a sulfonic acid function include 2-acrylamido-2-methylpropanesulfonic acid and the sodium, calcium and ammonium salts thereof. An aqueous solution containing about 50 percent by weight of active monomer can be employed in the reaction in an amount in the range of from about 1 to about 35, and preferably in an amount in the range of from about 10 to about 20 percent by weight of the reaction mass.

Vinylamide monomers useful herein which do not include a sulfonic acid function include acrylamide, methacrylamide, N-methylacrylamide, N-i-propylacrylamide, N-i-propylmethacrylamide, N-t-butylacrylamide, N-t-butylmethacrylamide, N,N-dimethylacrylamide and N,N-dimethylmethacrylamide. An aqueous solution containing about 52 percent by weight of active monomer, can be employed in the reaction in an amount in the range of from about 1 to about 30 percent by weight of the reaction mass.

The process for making the cementing fluid loss additive of this invention is comprised of the steps of:

(a) Providing a reaction vessel equipped with means for introducing material into the reaction vessel, means for stirring the contents of the reaction vessel, means for heating the contents of the reaction vessel, means for measuring the temperature of the contents of the reaction vessel, and means for introducing nitrogen into the reaction vessel;

(b) Introducing into the reaction vessel a quantity of deionized water, and stirring the contents of the reaction vessel at about 150 revolution per minute;

(c) Introducing into the reaction vessel a quantity of a monomer of a vinylamide derivative which does contain a sulfonic acid function, such as the sodium salt of 2-acrylamido-2-methylpropanesulfonic acid;

(d) Introducing into the reaction vessel a quantity of a reaction accelerator, such as potassium chloride;

(e) Introducing into the reaction vessel a quantity of a molecular weight control agent, such as potassium humate, which could also function as a colloidal agent;

(f) Introducing into the reaction vessel a quantity of a vinylamide derivative which does not contain a sulfonic acid function, such as acrylamide;

(g) Introducing into the reaction vessel a quantity of a base material, such as sodium hydroxide, to adjust the pH of the contents of the reaction vessel;

(h) Heating the contents of the reaction vessel to a value of about 114° F.;

(i) Introducing nitrogen into the reaction vessel for about one hour to purge the reaction vessel of oxygen;

(j) Introducing into the reaction vessel, after the contents of the reaction vessel have attained a temperature of about 114° F. and after the vessel has been purged, a quantity of a chain transfer agent, such as tetraethylene pentamine;

(k) Introducing into the reaction vessel a quantity of a polymerization initiator, such as sodium persulfate;

(l) Monitoring the reaction and measuring the temperature of the contents of the reaction vessel every two minutes until the temperature attains a maximum value;

(m) Adjusting the temperature of the contents of the reaction vessel to a value of about 160° F.;

(n) Maintaining the temperature of the contents of the reaction vessel at about 160° F. for about two hours after addition of the polymerization initiator to the reaction vessel;

(o) Discontinuing stirring, heating and purging;

(p) Permitting the contents of the reaction vessel to cool to room temperature; and (q) Drying the solution in the reaction vessel to recover the dry cementing fluid loss additive of this invention. This step is optional. The fluid loss additive of this invention can be employed in an aqueous solution.

One cementing fluid loss additive of this invention is the copolymer product of the polymerization reaction of the sodium salt of 2-acrylamido-2-methylpropanesulfonic acid (the first vinylamide derivative) and acrylamide (the second vinylamide derivative) in the presence of potassium humate. The ratio of the first vinylamide derivative to the second vinylamide derivative is an amount in the range of from about 0.3 to about 2.0 and preferably about 0.72 moles of the first vinylamide derivative per mole of the second vinylamide derivative. The ratio of the first vinylamide derivative to potassium humate is an amount in the range of from about 1.0 to about 25 and preferably about 13.3 moles of the first vinylamide derivative per mole of potassium humate.

The reaction accelerator can be present in the reaction in an amount of up to about 10 percent by weight of the reaction mass. Useful reaction accelerators include potassium chloride, sodium chloride and calcium chloride.

A 12 percent aqueous solution of molecular weight control agent can be present in the reaction in an amount in the range of from about 1 to about 12 percent by weight of the reaction mass. Useful molecular weight control agents include humic acid, potassium humate, sodium humate and ammonium humate.

A 50 percent aqueous solution of a base material can be present in the reaction in an amount in the range of from about 0.01 to about 3 percent by weight of the reaction mass. Useful base materials employed to adjust the pH of the reaction mass include sodium hydroxide, potassium hydroxide and ammonium hydroxide.

The chain transfer agent can be present in the reaction in an amount in the range of from about 0.05 to about 5 percent by weight of the reaction mass. Useful chain transfer agents include tetraethylenepentamine, diethytriamine, triethyletramine and mercaptoethanol.

The polymerization initiator can be present in the reaction in an amount in the range of from about 0.05 to about 0.6 percent by weight of the reaction mass. Useful polymerization initiators include sodium persulfate and ammonium persulfate.

A cementing fluid loss additive was prepared in accordance with the process described above. Table A defines and describes materials employed in the process. Table A1 defines the recipe employed in the process for making a cementing fluid loss additive of this invention.

TABLE A

Ingredients Employed in Making Cementing Fluid Loss Additive (FLA) Definitions, Functions, Activities and Molecular Weights

| Item | Ingredient | Definition | Function | Molecular Weight |
|---|---|---|---|---|
| 1 | D.I Water | de-ionized water | diluent, reaction medium | 18.01 |
| 2 | ATBS | 2-acrylamido-2-propanesulfonic acid, sodium salt, 50% aqueous solution | first monomer reactant | 229.23 |
| 3 | KCI | potassium chloride, 100% active | reaction accelerator | 74.55 |
| 4 | K Humate | potassium humate, 12% active solution | molecular weight control | 258.35 |
| 5 | ACR | acrylamide, 52% aqueous solution | second monomer reactant | 71.08 |
| 6 | NaOH | sodium hydroxide, 50% active solution | base neutralizer | 40.01 |
| 7 | D.I. Water | de-ionized water | diluent, reaction medium | 18.01 |
| 8 | TEPA | tetraethylenepentamine, 100% active | chain transfer agent | 189.30 |
| 9 | D.I. Water | de-ionized water | diluent, reaction medium | 18.01 |
| 10 | SP | sodium persulfate, 100% active | polymerization initiator | 238.10 |

TABLE A1

Cementing Fluid Loss Additive (FLA) Recipe

| Item | Ingredient | Quantity grams (fn 1) | Weight percent (fn 2) | Moles active (fn 3) | Mole percent active (fn 4) | Moles ATBS per mole (fn 5) |
|---|---|---|---|---|---|---|
| 1 | D.I. Water | 745.7600 | 62.1468 | 41.4081 | 90.8411 | 0.0093 |
| 2 | ATBS | 176.6972 | 14.7248 | 0.3854 | 0.8455 | 1.0000 |
| 3 | KCL | 101.6514 | 8.4710 | 1.3635 | 2.9913 | 0.2827 |
| 4 | K Humate | 62.3853 | 5.1988 | 0.0290 | 0.0636 | 13.3007 |
| 5 | ACR | 73.3945 | 6.1162 | 0.5369 | 1.1779 | 0.7178 |
| 6 | NaOH | 0.5872 | 0.0489 | 0.0073 | 0.0161 | 52.5259 |
| 7 | D.I. Water | 17.7982 | 1.4832 | 0.9882 | 2.1680 | 0.3900 |
| 8 | TEPA | 0.9174 | 0.0765 | 0.0048 | 0.0106 | 79.5253 |
| 9 | D.I. Water | 15.0459 | 1.2538 | 0.8354 | 1.8327 | 0.4613 |
| 10 | SP | 5.7600 | 0.4800 | 0.0242 | 0.0531 | 15.9318 |
| Totals | | 1199.9970 | 100.0000 | 45.5830 | 100.0000 | |

Footnotes:
1. Weight of material added to reaction vessel, see Table A.
2. Weight percent of material added to reaction vessel.
3. Moles of active material added to reaction vessel.
4. Mole percent of active material added to reaction vessel.
5. Active moles of ATBS per mole of designated active material.

The invention provides a method of making a cementing composition containing the cementing fluid loss additive of this invention, and a slurry containing the cementing composition. The method of making the cementing composition is comprised of mixing dry ingredients in any convenient order to produce a dry product. The method of making the slurry is comprised of mixing the cementing composition with water in any convenient order.

Cementing compositions and cement slurries were prepared. Table B defines and describes materials employed in the preparation of cementing compositions and cementing slurries.

Table B1 provides recipes for a total of six dry cementing compositions. Compositions 1, 2, 4, 5, and 6 include the dry cementing fluid loss additive made as described in Table A1. Composition 3 does not include any ingredient other than cement.

Table B2 provides recipes for making a total of nine cementing slurries containing the compositions described in Table B1.

TABLE B

Ingredients Employed in Making Cementing Composition Definitions, Functions, Activities and Molecular Weights

| Item | Ingredient | Definition | Function |
|---|---|---|---|
| 1 | Class H cement | Hydraulic Cement API Spec. 10 | basic well cement for use from surface to 8000 feet |
| 2 | FW | Fresh Water 0% salt | water mixed with cement composition to form slurry |
| 3 | SSW | Saturated Salt Water water containing 38% sodium chloride (77° F.) | water mixed with cement composition to form slurry |
| 4 | SA | Dry blend, 80 wt parts diutan gum, 240 wt parts silica flour | added to cement composition to help suspend particle sof cement in slurry |
| 5 | FLA | Fluid Loss Additive dried copolymer product produced by recipe of Table A1 | added to cement composition to reduce loss of water from slurry |
| 6 | SG | Sodium gluconate | cement set time intensifier |
| 7 | SGCLS | Dry blend, 25 wt parts SG, 75 wt. parts CLS | cement set time retarder and retarder intensifier |

TABLE B-continued

Ingredients Employed in Making Cementing Composition Definitions, Functions, Activities and Molecular Weights

| Item | Ingredient | Definition | Function |
|---|---|---|---|
| 8 | SSA - 1 | silica flour | strength stabilizing agent |
| 9 | CLS | calcium lignosulfonate | added to cement composition to retard the set time of slurry |
| 10 | TTA | tartaric acid | added to cement composition to retard the set time of slurry |

TABLE B1

Cementing Compositions

| Ingredient (fn 1) | CEMENTING COMPOSITION grams (fn 2 & 3) | | | | | |
|---|---|---|---|---|---|---|
| | 1 | 2 | 3 | 4 | 5 | 6 |
| Class H cement | 100.00 | 100.00 | 100.00 | 100.00 | 100.00 | 100.000 |
| FLA | 0.60 | 0.60 | | 0.60 | 0.40 | 0.700 |
| SGCLS | 0.30 | 0.30 | | | | |
| SA | | 0.05 | | | | 0.075 |
| SSA - 1 | | | | | | 35.000 |
| CLS | | | | | | 1.200 |
| TTA | | | | | | 0.600 |
| TOTAL | 100.90 | 100.95 | 100.00 | 100.60 | 100.40 | 137.575 |

Footnotes:
1. See Table B for definitions of ingredients.
2. See Table A1 for recipe of fluid loss additive (FLA)
3. Weights based on 100 grams of cement.

TABLE B2

Cementing Slurries

| Ingredient | Cementing Slurry grams | | | | | | | | |
|---|---|---|---|---|---|---|---|---|---|
| | 1 | 2 | 3 | 4 | 5 | 6 | 7 | 8 | 9 |
| Comp. 1 | 100.90 | 100.90 | | | | | | | |
| Comp. 2 | | | 101.10 | | | | | | |
| Comp. 3 | | | | 100.00 | | 100.00 | | | |
| Comp. 4 | | | | | 100.60 | | | 100.60 | |
| Comp. 5 | | | | | | | 100.40 | | |
| Comp. 6 | | | | | | | | | 137.53 |
| FW | 38.00 | | | 38.00 | 38.00 | 53.00 | 53.00 | 53.00 | 38.00 |
| SSW | | 38.00 | 38.00 | | | | | | |
| Total Weight | 138.90 | 138.90 | 139.10 | 138.00 | 138.60 | 153.00 | 153.40 | 153.60 | 175.53 |
| Slurry Density lb/gal | 16.50 | 16.50 | 16.50 | 16.50 | 16.50 | 15.00 | 15.00 | 15.00 | 17.40 |

The cementing slurries described in Table B2 were tested to determine consistency and API fluid loss. Consistency was measured at 100 and 180 degrees F. Fluid loss was measured at 100, 180, 250 and 350 degrees F. The test results are reported in Table B3.

TABLE B3

Results From Testing of Cement Slurries

| Slurry | Fann Viscometer Data (Rotor R1, Bob B1 Spring F1) | | | | | API Fluid Loss |
|---|---|---|---|---|---|---|
| | 180° F. rpm | | | | | 180° F. |
| | 300 | 200 | 100 | 6 | 3 | cc/30 min |
| 1 | 97 | 65 | 32 | 2 | 1 | 42 |
| 2 | 56 | 37 | 17 | 1 | 1 | 44 |
| 3 | 91 | 66 | 39 | 11 | 10 | 68 |
| | 100° F. rpm | | | | | 100° F. |
| | 300 | 200 | 100 | 6 | 3 | cc/30 min |
| 4 | 133 | 115 | 92 | 23 | 15 | — |
| 5 | 132 | 95 | 54 | 7 | 5 | 89 |
| 6 | 31 | 27 | 21 | 10 | 6 | — |
| 7 | 27 | 18 | 9 | 0 | 0 | 113 |
| 8 | 27 | 17 | 8 | 0 | 0 | |
| | | | | | | 250° F. cc/30 min |
| 9 | | | | | | 67 |
| | | | | | | 350° F. cc/30 min |
| 9 | | | | | | 97 |

The data in Table B3 illustrates that the cementing fluid additive of this invention does control fluid loss at temperatures up to 350° F.

The invention claimed is:

1. A method of making a cementing fluid loss additive, said method consisting of combining a first monomer with a second monomer in a polymerization reaction in the presence of a molecular weight control agent and at a pH in the range of from about 7.0 to about 10.5; wherein:
   said first monomer is a vinylamide derivative which does include a sulfonic acid function in its structure, and said second monomer is a vinylamide derivative which does not include a sulfonic acid function in its structure;
   said molecular weight control agent is selected from humic acid, potassium humate, sodium humate and ammonium humate; and
   the ratio of said first monomer to said second monomer in said reaction is an amount in the range of from about 0.3 to about 2.0 moles of said first monomer per mole of said second monomer.

2. The product of the method of claim 1.

3. The method of claim 1 wherein said first monomer is 2-acrylamido-2-methylpropanesulfonic acid and the sodium, calcium and ammoniuim salts thereof, and the second monomer is selected from acrylamide, methacrylamide, N-methylacrylamide, N-i-propylacrylamide, N-i-propylmethacrylamide, N-t-butylacrylamide, N-t-butylmethacrylamide, N,N-dimethylacrylamide and N,N-dimethylmethacrylamide.

4. The method of claim 1 wherein said first monomer is the sodium salt of 2-acrylamido-2-methylpropanesulfonic acid and the second monomer is acrylamide and said molecular weight control agent is potassium humate.

5. The method of claim 4 wherein said ratio of said first monomer to said second monomer is about 0.72 moles of said first monomer per mole of said second monomer.

6. A method of making a cementing composition, said method being comprised of combining hydraulic cement with a cementing fluid loss additive made by the method consisting of combining a first monomer with a second monomer in a polymerization reaction in the presence of a molecular weight control agent and at a pH in the range of from about 7.0 to about 10.5;
wherein:
   said molecular weight control agent is selected from humic acid, potassium humate, sodium humate and ammonium humate; and
   the ratio of said first monomer to said second monomer in said reaction is an amount in the range of from about 0.3 to about 2.0 moles of said first monomer per mole of said second monomer;
and further wherein:
   said first monomer is 2-acrylamido-2-methylpropanesulfonic acid and the sodium, calcium and ammoniuim salts thereof, and
   said second monomer is selected from acrylamide, methacrylamide, N-methylacrylamide, N-i-propylacrylamide, N-i-propylmethacrylamide, N-t-butylacrylamide, N-t-butylmethacrylamide, N,N-dimethylacrylamide and N,N-dimethylmethacrylamide.

7. The cementing composition product of the method of claim 6.

8. The cementing composition of claim 7 mixed with water to form a slurry containing in the range of from about 35 to about 55 pounds of water per 100 pounds of said hydraulic cement in said cementing composition.

9. The method of claim 6 wherein said first monomer is the sodium salt of 2-acrylamido-2-methylpropanesulfonic acid and the second monomer is acrylamide and said molecular weight control agent is potassium humate.

10. The method of claim 9 wherein said ratio of said first monomer to said second monomer in said reaction is about 0.72 moles of said first monomer per mole of said second monomer.

* * * * *